United States Patent
Adams et al.

(10) Patent No.: US 8,050,392 B2
(45) Date of Patent: Nov. 1, 2011

(54) METHODS SYSTEMS, AND PRODUCTS FOR PROCESSING RESPONSES IN PROMPTING SYSTEMS

(75) Inventors: Valencia Adams, Snellville, GA (US); Robert A. Koch, Norcross, GA (US); Steven N. Tischer, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1624 days.

(21) Appl. No.: 11/377,989

(22) Filed: Mar. 17, 2006

(65) Prior Publication Data

US 2007/0220127 A1    Sep. 20, 2007

(51) Int. Cl.
    *H04M 11/00* (2006.01)
(52) U.S. Cl. ............ 379/93.34; 379/88.08; 379/201.02
(58) Field of Classification Search ............ 379/88.16, 379/114.2, 93.12, 80; 709/223, 217
See application file for complete search history.

(56) References Cited

U.S. PATENT DOCUMENTS

| | | | |
|---|---|---|---|
| 4,142,067 A | 2/1979 | Williamson | |
| 4,788,715 A | 11/1988 | Lee | |
| 5,455,853 A | 10/1995 | Cebulka et al. | |
| 5,553,121 A | 9/1996 | Martin et al. | |
| 5,864,605 A * | 1/1999 | Keshav | 379/88.01 |
| 5,867,572 A | 2/1999 | MacDonald | |
| 5,872,834 A | 2/1999 | Teitelbaum | |
| 6,016,336 A * | 1/2000 | Hanson | 379/88.23 |
| 6,044,382 A * | 3/2000 | Martino | 715/234 |
| 6,061,433 A * | 5/2000 | Polcyn et al. | 379/93.12 |
| 6,064,730 A | 5/2000 | Ginsberg | |
| 6,104,790 A | 8/2000 | Narayanaswami | |
| 6,122,346 A | 9/2000 | Grossman | |
| 6,370,238 B1 | 4/2002 | Sansone et al. | |
| 6,456,619 B1 | 9/2002 | Sassin et al. | |
| 6,487,277 B2 | 11/2002 | Beyda et al. | |
| 6,584,181 B1 * | 6/2003 | Aktas et al. | 379/88.23 |
| 6,665,644 B1 | 12/2003 | Kanevsky et al. | |
| 6,690,776 B1 | 2/2004 | Raasch | |
| 6,714,643 B1 | 3/2004 | Gargeya | |
| 6,718,017 B1 * | 4/2004 | Price et al. | 379/88.22 |
| 6,738,473 B1 | 5/2004 | Burg | |
| 6,775,264 B1 | 8/2004 | Kurganov | |
| 6,798,877 B2 | 9/2004 | Johnson | |
| 6,801,620 B2 | 10/2004 | Smith | |
| 6,820,260 B1 | 11/2004 | Flockhart | |
| 6,842,767 B1 | 1/2005 | Partovi | |
| 6,853,966 B2 | 2/2005 | Bushey | |
| 6,885,733 B2 | 4/2005 | Pearson et al. | |
| 6,922,466 B1 | 7/2005 | Peterson et al. | |
| 6,944,592 B1 | 9/2005 | Pickering | |
| 7,065,188 B1 * | 6/2006 | Mei et al. | 379/88.23 |
| 7,386,103 B1 * | 6/2008 | Chahal | 379/88.23 |
| 2001/0024497 A1 | 9/2001 | Campbell | |
| 2003/0005076 A1 * | 1/2003 | Koch et al. | 709/217 |
| 2003/0041314 A1 | 2/2003 | Heeren et al. | |
| 2003/0112952 A1 | 6/2003 | Brown | |
| 2003/0195748 A1 * | 10/2003 | Schalkwyk | 704/231 |

(Continued)

*Primary Examiner* — Simon Sing
*Assistant Examiner* — Assad Mohammed
(74) *Attorney, Agent, or Firm* — Scott P. Zimmerman PLLC

(57) ABSTRACT

Methods, systems, and products are disclosed for processing responses in a prompting system. Responses are monitored to a menu of prompts in the prompting system. A response to a prompt is tagged with a location identifier. The location identifier identifies subject matter that corresponds to the prompt. The location identifier is stored in a database. If the menu of prompts changes, then the location identifier permits navigation to the same subject matter, even though the prompt is reassigned to new subject matter.

20 Claims, 15 Drawing Sheets

U.S. PATENT DOCUMENTS

| | | |
|---|---|---|
| 2003/0232640 A1 | 12/2003 | Walker |
| 2004/0006476 A1 | 1/2004 | Chiu |
| 2004/0042592 A1 | 3/2004 | Knott |
| 2004/0042593 A1 | 3/2004 | Gulrajani et al. |
| 2004/0120479 A1* | 6/2004 | Creamer et al. ........... 379/88.22 |
| 2004/0153322 A1 | 8/2004 | Neuberger et al. |
| 2004/0205731 A1 | 10/2004 | Junkermann |
| 2005/0008141 A1 | 1/2005 | Kortum |
| 2005/0027536 A1 | 2/2005 | Matos |
| 2005/0060304 A1 | 3/2005 | Parikh |
| 2005/0069122 A1 | 3/2005 | Lin |
| 2005/0135338 A1 | 6/2005 | Chiu et al. |
| 2005/0137875 A1 | 6/2005 | Kim et al. |
| 2007/0101394 A1* | 5/2007 | Fu et al. ........................ 725/134 |

* cited by examiner

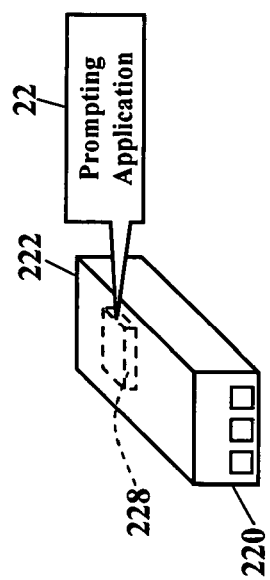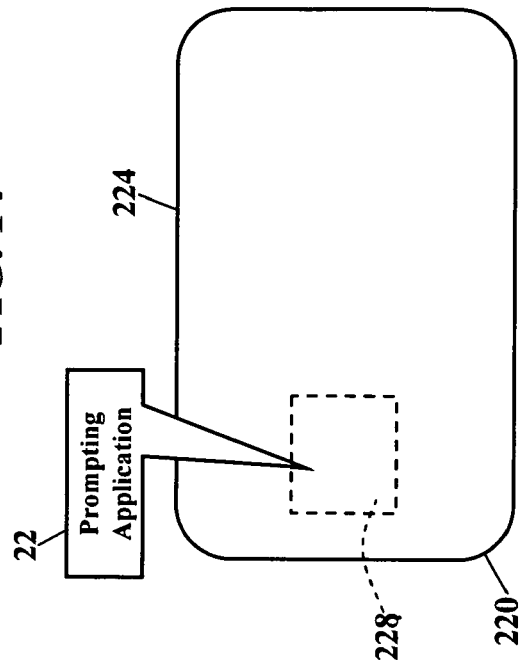
FIG. 13
FIG. 14

METHODS SYSTEMS, AND PRODUCTS FOR PROCESSING RESPONSES IN PROMPTING SYSTEMS

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to prompting systems.

Prompting systems are very popular in today's communications environment. These prompting systems, such as an Interactive Voice Response (IVR) system, quickly direct a user to a particular department, extension, or information. These prompting systems may even recognize a user and truncate a menu of prompts. Some prompting systems store a user's sequence of responses. Some prompting systems, for example, store a sequence of DTMF inputs. Should the user subsequently interact with the menu of prompts, some prompting systems recall the user's previous inputs and truncate the menu of prompts. The menu of prompts may be truncated to the same destination as the previous call. These prompting systems are thus an efficient and less expensive method of resolving customer inquiries.

While prompting systems are great, current prompting systems do not adequately account for dynamically changing menu trees. Because prompting systems are great for businesses and for customers, the menu of prompts may frequently change to reflect redesigned or new subject matter. This dynamic environment, however, presents problems when truncating the menu. Simply saving a sequence of inputs would not be of benefit in a dynamic menu. A past sequence of inputs may no longer represent a current version of the menu. When a user subsequently interacts with the menu of prompts, the previous sequence may not navigate to the same menu destination. What is needed, then, is a prompting system that may truncate a dynamically changing menu of prompts.

SUMMARY

The aforementioned problems, and other problems, are reduced, according to the exemplary embodiments, using methods, systems, and products that process responses to a prompting system. The prompting system may be voice-based, such as an Interactive Voice Response (IVR) system. The prompting system, however, could also prompt with electronic messages. However the prompts are presented, exemplary embodiments truncate a menu of prompts without relying on a previous sequence of responses. That is, exemplary embodiments navigate the menu of prompts according to subject matter and not according to sequential responses. Here the prompting system bookmarks, or tags, each response with a location identifier. The prompting system then saves each location identifier in a database. Each location identifier identifies the subject matter within the menu of prompts that is selected by a user. The location identifier, for example, tags tier or nodal subject matter within a hierarchical menu of prompts. Should the user subsequently interact with the menu of prompts, the prompting system may return to the subject matter tagged by the location identifier. Even if the menu of prompts is partially or entirely redesigned or rearranged, the location identifier allows the prompting system to find the same subject matter. The prompting system may thus present a truncated menu, that reflects the user's previous interaction, regardless of how the menu of prompts changes.

The exemplary embodiments describe a method for processing responses in a prompting system. Responses are monitored to a menu of prompts in the prompting system. A response to a prompt is tagged with a location identifier. The location identifier identifies subject matter that corresponds to the prompt. The location identifier is stored in a database. If the menu of prompts changes, then the location identifier permits navigation to the same subject matter, even though the prompt is reassigned to new subject matter.

In another of the embodiments, a system is disclosed for processing responses in a prompting system. A prompting application is stored in memory and a processor communicates with the memory. The processor monitors responses to a menu of prompts in the prompting system. The processor tags a response to a prompt with a location identifier. The location identifier identifies subject matter that corresponds to the prompt. The processor stores the location identifier in a database for retrieval. If the menu of prompts changes, then the location identifier permits the processor to navigate to the same subject matter, even though the prompt is reassigned to new subject matter In yet another embodiment, a computer program product is also disclosed for processing responses in a prompting. The computer program product comprises a computer-readable medium storing computer code. This computer code monitors responses to a menu of prompts in the prompting system. A response to a prompt is tagged with a location identifier. The location identifier identifies subject matter that corresponds to the prompt. The location identifier is stored in a database. If the menu of prompts changes, then the location identifier permits navigation to the same subject matter, even though the prompt is reassigned to new subject matter.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 11-16 are schematics illustrating various other communications devices for processing responses, according to the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
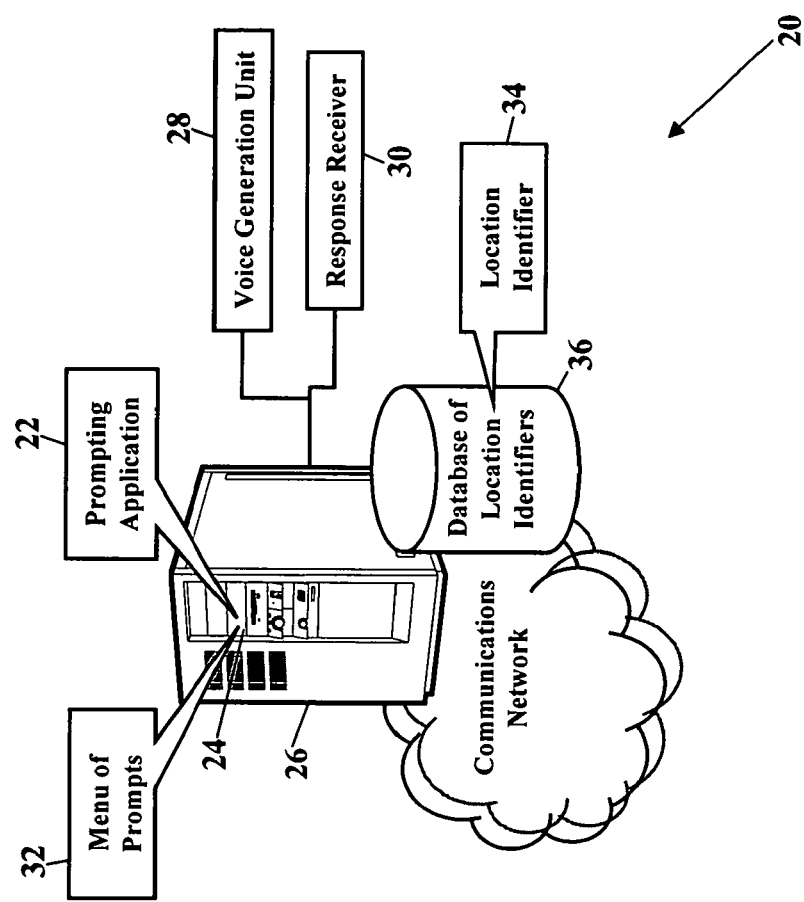
FIG. 1 is a schematic illustrating a prompting system, according to exemplary embodiments.

FIG. 1 is a schematic illustrating a prompting system 20, according to exemplary embodiments. The prompting system 20 comprises a prompting application 22 stored in memory 24 of a computer 26. The prompting system 20 may couple to a voice generation unit 28 and to a response receiver 30. The prompting system 20 audibly and/or visually presents a menu 32 of prompts to users. The menu 32 of prompts is stored in the memory 24. If the menu 32 of prompts includes voice portions, the voice generation unit 28 generates voice messages, and the response receiver 30 receives responses to those voice messages. The responses may be Dual-Tone Model Frequency (DTMF) inputs, such that the response receiver 30 receives and transmits the DTMF inputs. The responses may be vocal or audible and analyzed and interpreted by voice recognition. The responses may be electronic messages or inputs received by the prompting application 22. Although most readers are assumed to be generally familiar with an Interactive Voice Response system, the exemplary embodiments may be applied to any type of menu prompting system, whether exposed by audible, voice, or visual prompts. Any type of menu prompting system, having a sequence of choices that can be exposed for searching and for entry, may utilize the exemplary embodiments. Additionally, any vendor's Interactive Voice Response application may be designed or revised to include the principles described herein. The operating principles and componentry of a typical prompting system, however, are well understood by those of ordinary skill in the art and, thus, will not be further explained here. If the reader desires a further explanation, the reader is directed to the following sources, all incorporated herein by reference: U.S. Pat. No. 6,016,336 to Hanson (Jan. 18, 2000); U.S. Pat. No. 6,370,238 to Sansone et al. (Apr. 9, 2002); U.S. Pat. No. 6,456,619 to Sassin et al. (Sep. 24, 2002); U.S. Pat. No. 6,487,277 to Beyda et al. (Nov. 26, 2002); U.S. Pat. No. 6,885,733 to Pearson et al. (Apr. 26, 2005); and U.S. Pat. No. 6,922,466 to Peterson et al. (Jul. 26, 2005).

The prompting system 20, however, differs from a conventional prompting system. Here the prompting system 20 tags each response to the menu 32 of prompts. That is, as users speak, send, enter, or otherwise indicate their responses to the menu 32 of prompts, each response may be tagged or bookmarked. FIG. 1, for example, illustrates a location identifier 34. As a user indicates a response to the menu 32 of prompts, the prompting application 22 may monitor that response and may tag the response with the location identifier 34. The prompting application 22 may then save the location identifier 34 in a database 36 of location identifiers. Each location identifier 34 identifies the subject matter within the menu 32 of prompts that is selected by the user. The location identifier 34, in other words, tags subject matter and not just the user's response. As the user navigates the menu 32 of prompts, the prompting application 22 may monitor those responses and may tag one or more responses with the location identifier 34. When, for example, the menu 32 of prompts has a hierarchical tree structure, each level and each node represents different subject matter. The location identifier 34, then, tags the subject matter corresponding to each response.

In the figures described below, as in FIG. 1, reference numeral 20 refers to a prompting system and reference numeral 22 refers to a prompting application. The reader, however, will appreciate that the prompting system 20 and the prompting application 22 need not include all the elements and capabilities described. Rather, the prompting system 20 and the prompting application 22, according to exemplary embodiments, may include one or any combination of elements and capabilities for dynamically ordering the menu 32 of prompts described with reference to the figures.

Figure 2:
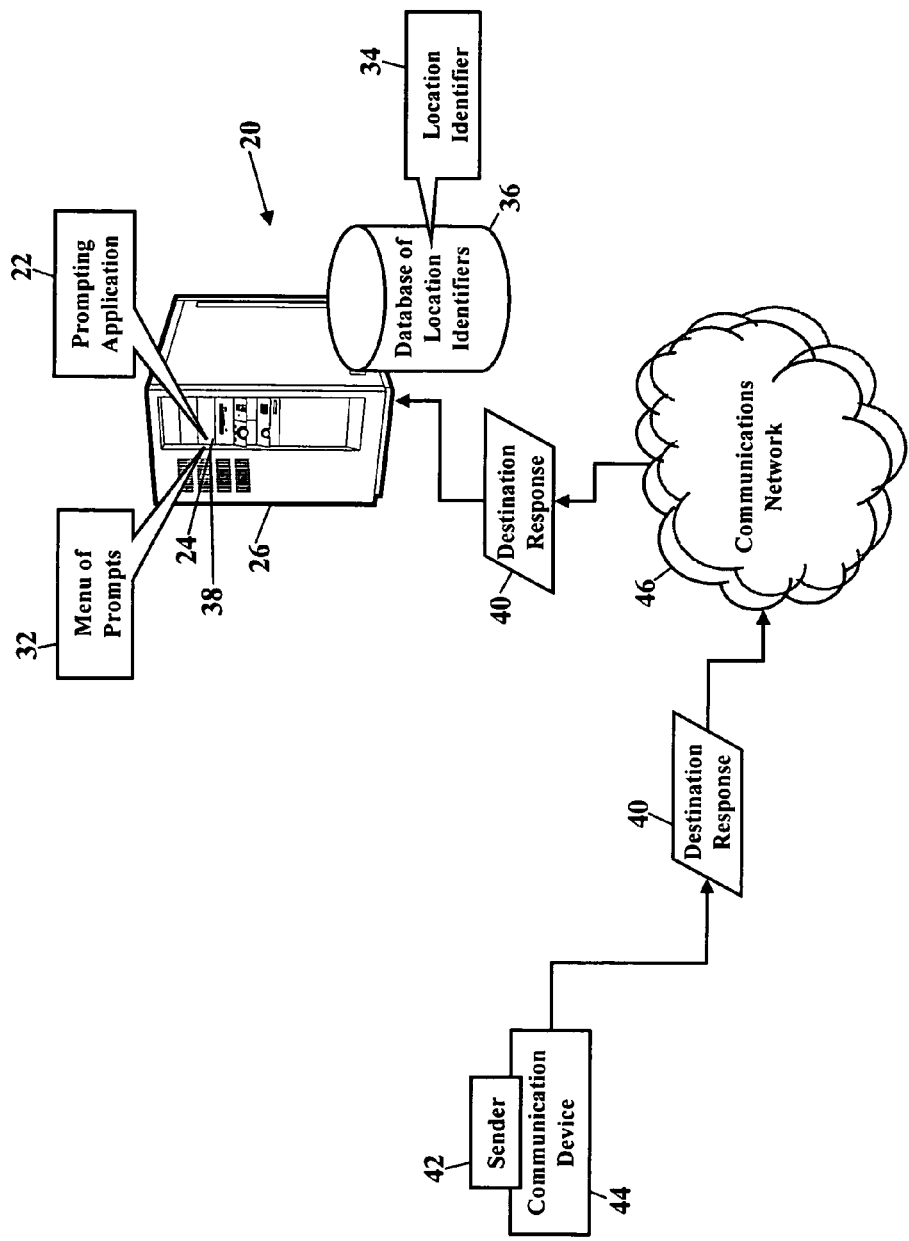
FIGS. 2-4 are schematics further illustrating the prompting system, according to exemplary embodiments.
Figure 3:
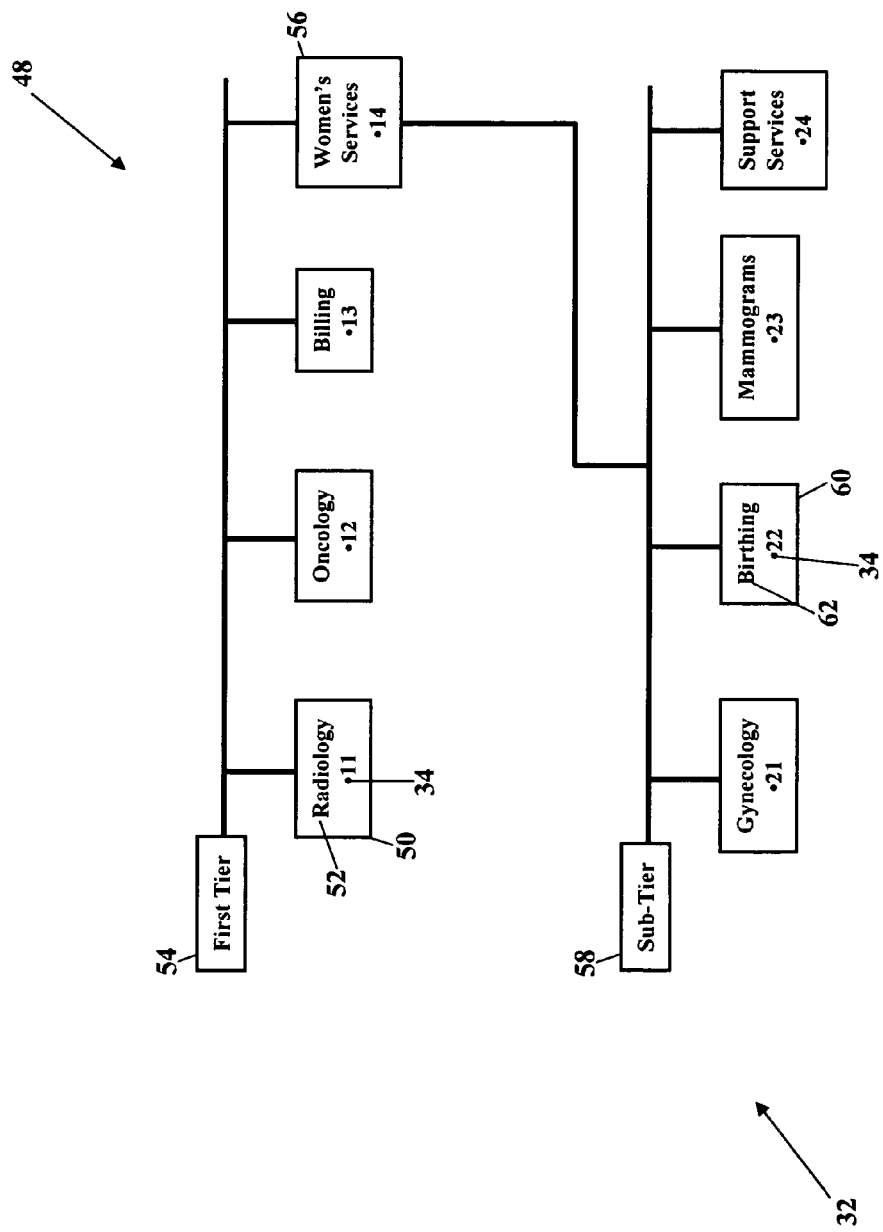
Figure 4:
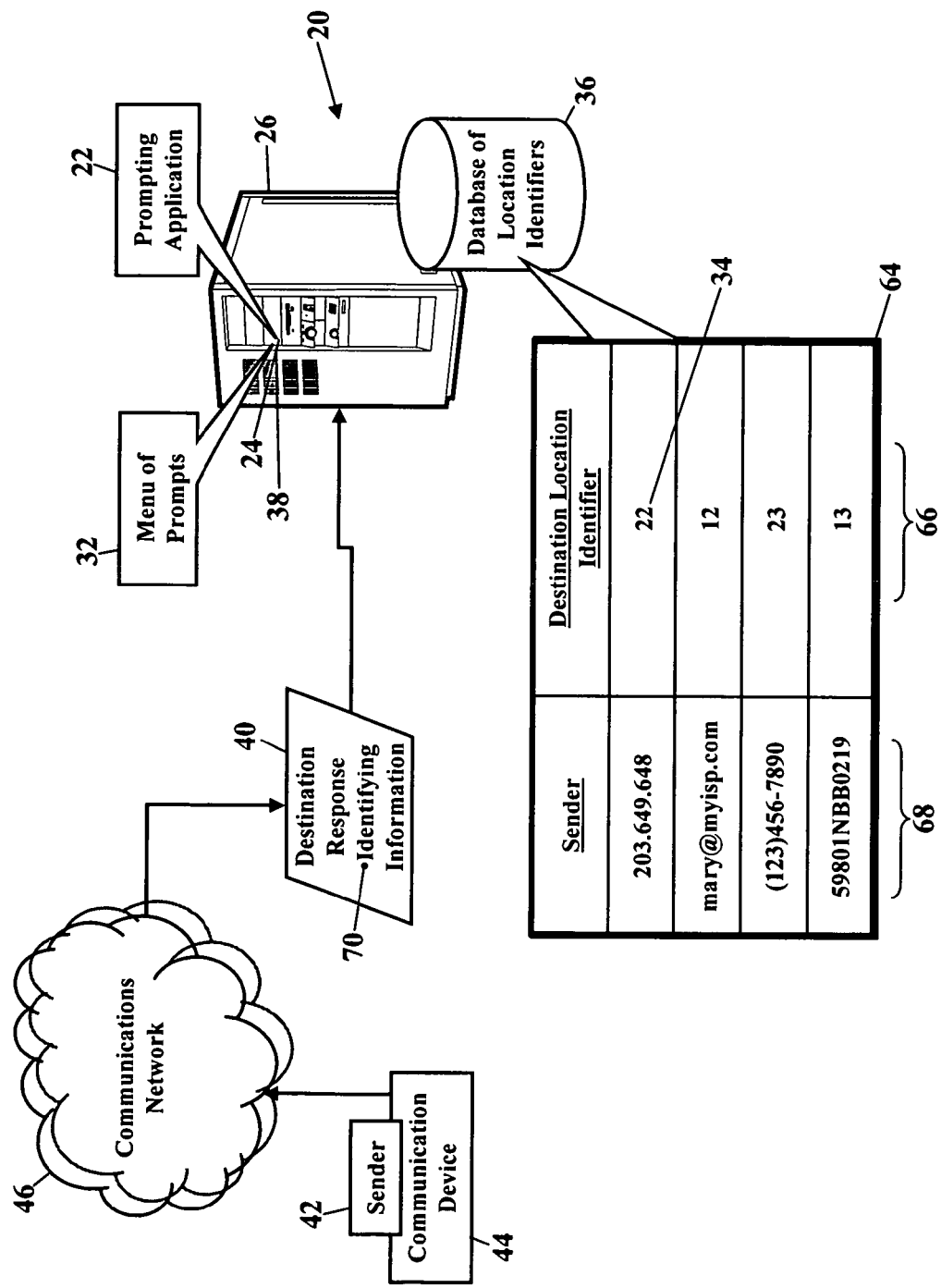

FIGS. 2-4 are schematics further illustrating the prompting system 20, according to exemplary embodiments. The prompting application 22 is again stored in the memory 24 of the computer 26. The prompting application 22 comprises computer code or instructions that cause a processor 38 to receive and to process a destination response 40 from a sender 42. The destination response 40 is sent from the sender's communications device 44 and communicates via a communications network 46, examples of which are described below. (Although the sender's communications device 44 is generically shown, later paragraphs and figures will describe the sender's communications device 44 in greater detail.) The destination response 40 responds to a final prompt from the menu 32 of prompts. The prompting application 22, as above explained, may tag one, some, or all responses to the menu 32 of prompts. Here, however, the prompting application 22 tags the destination response 40. That is, while the prompting application 22 may tag an entire string or sequence of responses to the menu 32 of prompts, in this embodiment the destination response 40 is tagged. The destination response 40 is thus the last response to a last prompt from the menu 32 of prompts. When the user navigates to an end of the menu 32 of prompts, the prompting application 22 associates the destination response 40 to the corresponding subject matter in the menu 32 prompts.

FIG. 3 provides an illustration of an exemplary menu of prompts. Although the menu 32 of prompts may have any structure, FIG. 3 illustrates the menu 32 of prompts as having a simple hierarchical tree structure 48 for a hospital or other medical facility. FIG. 3 illustrates two levels of prompts, with each hierarchical level having one or more nodes 50. Each node 50 has a corresponding subject matter 52, and each node's subject matter 52 is also associated with the corresponding location identifier 34. Suppose a sender navigates along a first tier 54 to a "Women's Services" prompt 56. Because this prompt has a sub-tier 58, the user continues navigating the tree 48, for example, to the "Birthing" node 60. The "Birthing" node 60 is thus the destination. The prompting application (shown as reference numeral 22 in FIGS. 1-2), again, may tag one, some, or all of the sequential responses to the menu 32 of prompts. Here, however, the prompting application 22 tags the destination response. The "Birthing" node 60, in this example, has a simple subject matter 62 of "Birthing" and the associated destination location identifier 34 is "22." The location identifier 34 is thus hierarchically descriptive of nodal subject matter. The location identifier 34, then, need not be associated with responses (such as DTMF keys) to the menu 32 of prompts. The location identifier 34, instead, is associated to nodal subject matter. Those of ordinary skill in the art may understand that the location identifier 34 may include any alphanumeric combination of letters, words, or phrases. In this disclosure a very simple example of "22" is provided. The location identifier 34, however, may be more complex and have contextual meaning.

The location identifier 34 may identify an upper tier or node. The location identifier 34, as earlier explained, identifies the subject matter within the menu 32 of prompts that is selected by the user. The location identifier 34, however, may additionally or alternatively identify a node and/or tier hierarchically above the subject matter selected by the user. This "superordinate" or "hierarchical parent" may be useful when and if the exact subject matter location no longer exists in the hierarchical tree. Referring again to FIG. 3, suppose the "Birthing" node 60 is changed to "Obstetrics." Even though the corresponding location identifier remains "22," the old subject matter of "Birthing" is no longer found in the hierarchical tree structure 48. In this example, however, because the location identifier may also track and identify the superordinate "Women's Services" prompt 56, the prompting application 22 could begin with that superordinate. The prompting application 22, for example, could prompt the sender with "We are sorry, but we cannot locate "birthing." We have, however, located "Women's Services," so please choose from the following:'Gynecology,' 'Obstetrics,' . . . " The superordinate thus again spares the sender from again traversing the entire hierarchical tree structure 48.

The superordinate location identifier also allows recursive navigation. Because the location identifier 34 may additionally or alternatively identify a node and/or tier hierarchically above the selected subject matter, each location identifier 34 may be represented as a data pair (n, n+1),
where n is the location identifier for the subject matter, and
where n+1 is the location identifier for the "superordinate" upper tier or node.

Each data pair may thus be used to recursively navigate up the hierarchical tree structure 48. Each data pair also permits hierarchical contextual meaning when creating prompts.

Now turning to FIG. 4, the prompting application 22 stores the destination location identifier 34. The prompting application 22 instructs the processor 28 to store the destination location identifier 34 in the database 36 of location identifiers. FIG. 4 illustrates the database 36 of location identifiers as including a table 64. The table 64 relates, associates, or maps destination location identifiers 66 to senders 68. As the processor 38 stores the destination location identifier 34 (e.g. "22"), the processor 38 also stores identifying information 70 that identifies the sender 42 and/or the sender's communications device 44. The identifying information 70, for example, may be a communications address, such as a telephone number, Internet Protocol address, or caller ID information. The identifying information 70, however, may include a name, address, social security number, account number, or any other information that uniquely identifies the sender 42 and/or the sender's communications device 44. Whatever the identifying information 70, the table 64 relates the sender to the destination location identifier.

Figure 5:
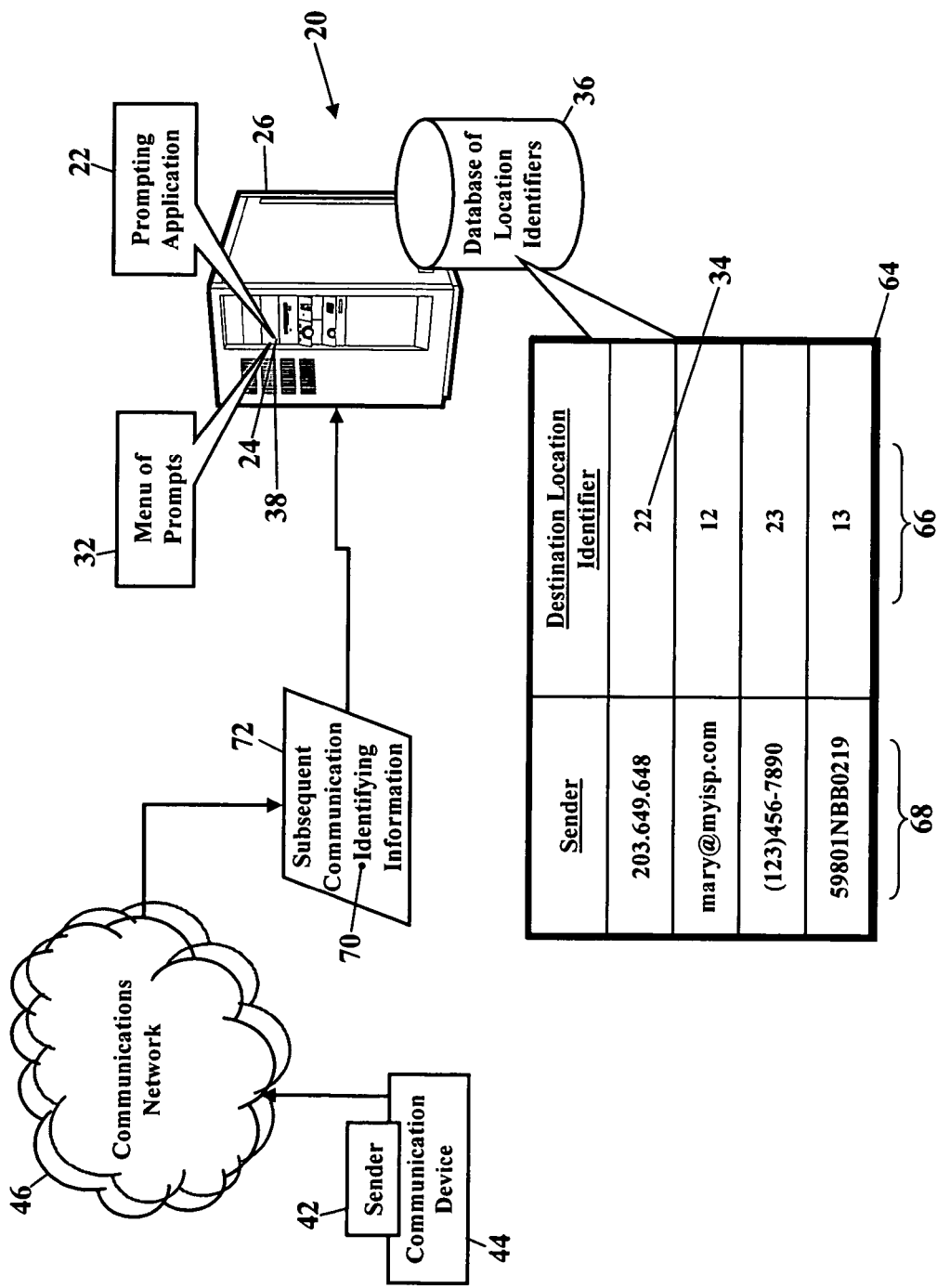
FIGS. 5 and 6 are schematics illustrating a subsequent communication, according to more exemplary embodiments.
Figure 6:
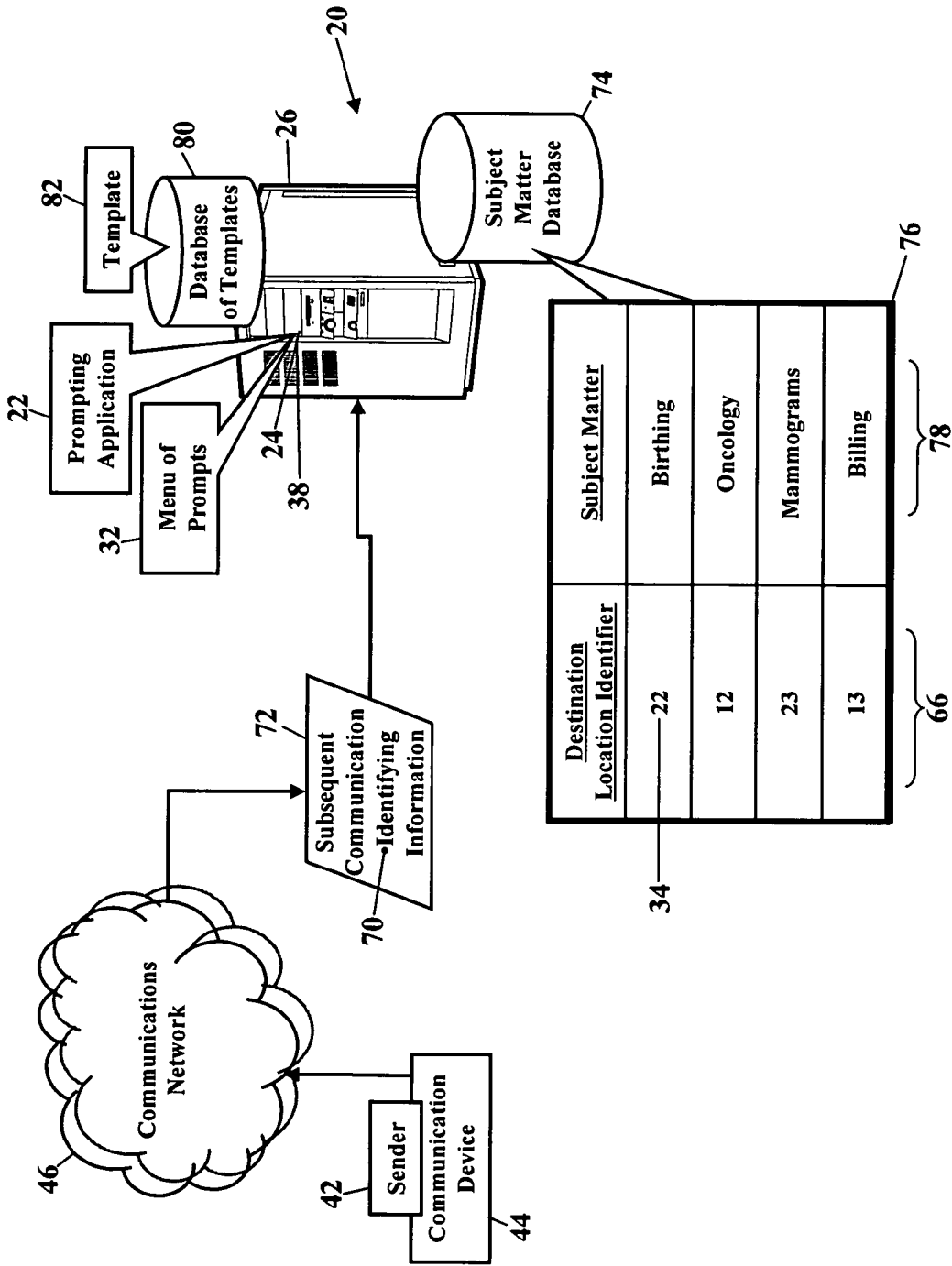

FIGS. 5 and 6 are schematics illustrating a subsequent communication, according to more exemplary embodiments. When the sender 42 sends a subsequent communication 72 to the prompting application 22, the prompting application 22 may consult the database 36 of location identifiers. Because the subsequent communication 72 includes the sender's identifying information 70, the prompting application 22 may quickly determine whether the sender 42 has previously navigated the menu 32 of prompts. When the prompting application 22 receives the subsequent communication 72, the prompting application 22 queries the database 36 of location identifiers. The prompting application 22 queries to determine if the sender 42 is recognized. If the sender 42 (or the sender's communications device 44) is recognized, then the database 36 of location identifiers may store a previous location identifier associated with a previous communication. The database 36 of location identifiers consults the table 64 to determine whether the sender's identifying information 70 is found. If the sender's identifying information 70 is found, the database 36 of location identifiers recognizes the sender and returns the associated destination location identifier 34. If the associated destination location identifier 34 cannot be located, then the prompting application 22 may use the superordinate upper node or tier.

The prompting application 20 may then modify the menu 32 of prompts. Because the sender's identifying information 70 is found in the table 64, the sender 42 has previously interacted with the menu 32 of prompts. The prompting application 22 may then present a personalized greeting or personalized prompts. The prompting application 22 may use the sender's identifying information 70 to present a personalized greeting. The prompting application 22, for example, may present the audible or textual greeting "Hello, Mary, thank you for again contacting Women's Hospital." The prompting application 22 may thus use the sender's identifying information 70 to improve customer service by presenting a personalized greeting.

This exemplary embodiment continues with FIG. 6. The prompting application 20, however, may also truncate the menu 32 of prompts. Because the sender 42 has previously interacted with the menu 32 of prompts, the prompting application 22 may spare the sender 42 from again navigating the entire menu 32 of prompts. The prompting application 22 may immediately return the sender to the subject matter associated with the previous call's destination location identifier 34. The prompting application 22, as above explained, may retrieve the sender's previous location identifier 34 (as explained with reference to table 64 in FIG. 5). The prompting application 22 may then consult a subject matter database 74. The subject matter database 74 stores a subject matter table 76. The subject matter table 76 relates, associates, or maps the destination location identifiers 66 to subject matter 78 within the menu 32 of prompts. That is, no matter how the menu 32 of prompts is changed, the subject matter 78 associated with each node may be quickly located using the subject matter table 76. The prompting application 22 queries the subject matter database 74 for the destination location identifier 34. The subject matter database 74 consults the subject matter table 76 to determine whether the destination location identifier 34 is found. If the destination location identifier 34 is found, the subject matter database 76 returns the destination subject matter 78 associated with the sender's previous interaction with the menu 32 of prompts. FIG. 6, then, illustrates the sender's previous destination location identifier ("22") 34 associated with the subject matter "Birthing." If the destination location identifier 34 cannot be located, then the prompting application 22 may use the superordinate upper node or tier.

The prompting application 22 may then modify the menu 32 of prompts. Because the prompting application 22 knows the destination subject matter of the previous interaction (e.g., "Birthing"), the prompting application 22 may immediately present that same destination prompt to the sender. More likely, however, the prompting application 22 would prompt the sender to return to the same destination subject matter. The prompting application 22, for example, may use the destination subject matter to construct another personalized prompt. The prompting application 22 may insert the destination subject matter 78 into a template. Suppose, for example, the prompting application 22 has access to a database 80 of templates. One such template 82 may be represented by the audible or textual message "[insert sender's identifying information], your last inquiry involved [insert previous destination subject matter], so would you like to return to the same destination?"

The prompting application 22 then constructs the personalized prompt. The prompting application 22 collects the sender's identifying information 70. The prompting application 22 also collects the previous destination subject matter 78 from the subject matter table 76. The prompting application 22 then inserts the information into the template 82. Using the above example, the prompting application 22 produces "Mary, your last inquiry involved birthing, so would you like to return to the same destination?" The prompting application 22 thus prompts the sender to truncate the menu 32 of prompts. Because the prompting application 22 knows the destination subject matter 78 of the previous interaction, the prompting application 22 may immediately present that same destination prompt to the sender 42. If the sender 42 declines, the prompting application 22 may present the full menu 32 of prompts. If the sender 42 accepts, however, the sender is immediately placed into the truncated menu 32 of prompts.

The location identifier 34, then, allows more personalization. The location identifier 34 allows automated personalization of the menu 32 of prompts, even if the menu 32 changes. Should the menu 32 of prompts change, the location identifier 34 permits navigation to the same subject matter, even though one or more prompts may be reassigned to new subject matter. The prior art monitor and track sequential responses. Exemplary embodiments, however, track and monitor subject matter. As long as the subject matter table 76 accurately reflects the current version of the menu 32 of prompts, any portion of the menu 32 may be located by subject matter. Thus, no matter how the prompts are rearranged and/or reassigned, the prompting application 22 may use the location identifier 34 to locate similar subject matter. The location identifier 34, the table 64, and the subject matter table 76 are a separate information structure that produces a more contextual result for users.

The location identifier 34 also permits searching for subject matter. Because the location identifier 34 is associated with nodal subject matter, the menu 32 of prompts may be searched for any subject matter. If the prompting application 22 has or knows any location identifier, the prompting application 22 may query the subject matter database 74 for the location identifier 34. The subject matter database 74 consults the subject matter table 76 to determine what subject matter 78 maps to the location identifiers 66. Notice, however, that any subject matter may be located. That is, the location identifiers 66 need not be limited to a final destination in the menu 32 of prompts. Because the subject matter table 76 may encompass the entire menu 32 of prompts, the subject matter table 76 may contain every node's subject matter. The subject matter table 76, therefore, may be a comprehensive mapping of every hierarchical level and node within the menu 32 of prompts. The subject matter table 76, therefore, permits searching the menu 32 of prompts according to subject matter.

The location identifier 34 may be configurable. That is, a service provider and/or a sender/user may determine how and when the location identifier 34 is stored. The service provider, for example, may decide to store a sequential string of location identifiers for an entire interactive session with the menu 32 of prompts. The service provider, however, may instead only store the destination location identifier (as explained above). The service provider may also store any location identifier that corresponds to any response. Likewise, a user of the prompting application 22 may request to have their entire interactive session bookmarked, such that a sequential string of location identifiers is stored on behalf of the user. The user, in fact, may request that any response be bookmarked with the location identifier. The user may thus maintain a profile of bookmarks, with each bookmark indicating a location identifier and its associated subject matter. The prompting application 22 may even prompt the user to bookmark one, some, or all responses for subsequent retrieval.

Figure 7:
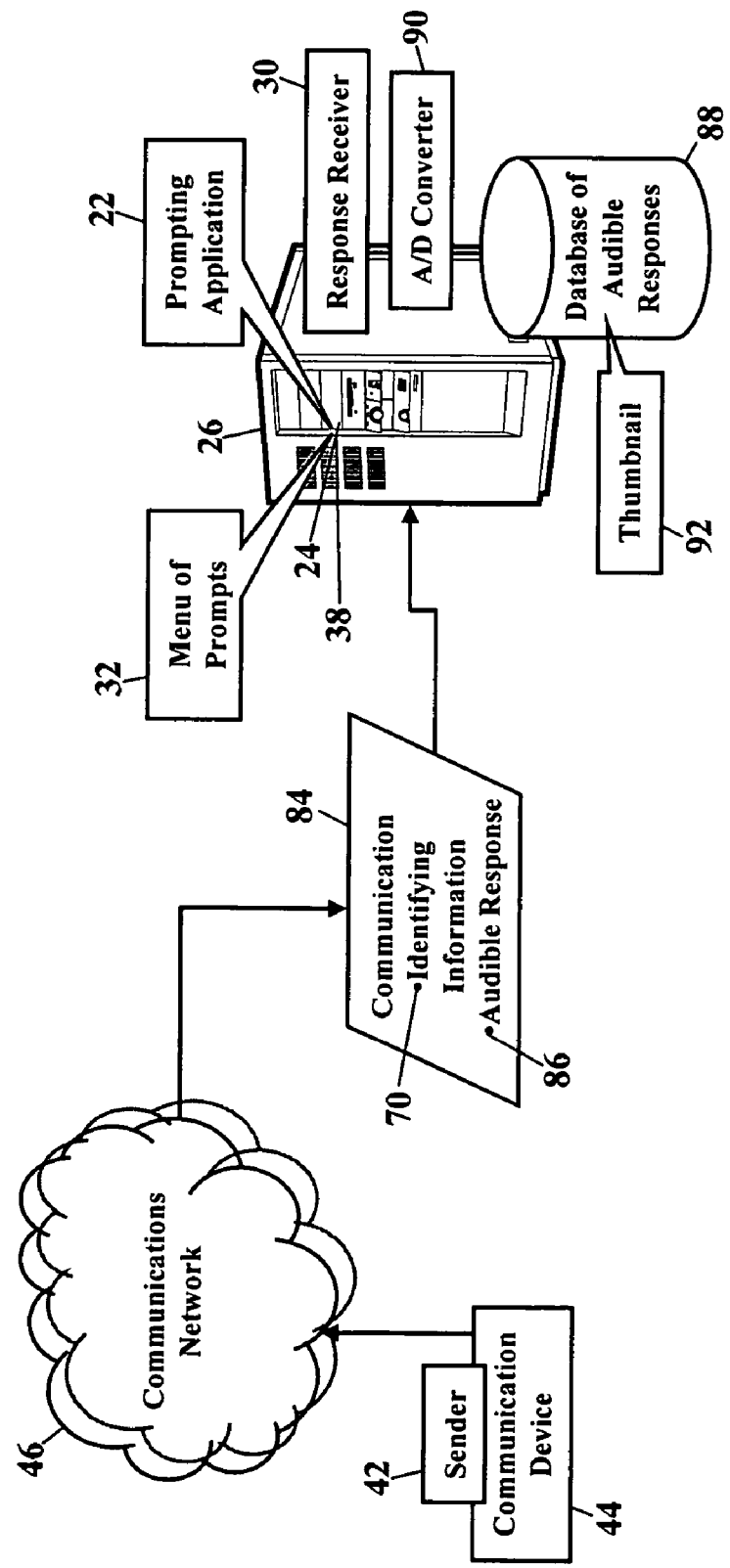
FIGS. 7 and 8 are schematics illustrating compression rules, according to more exemplary embodiments.
Figure 8:
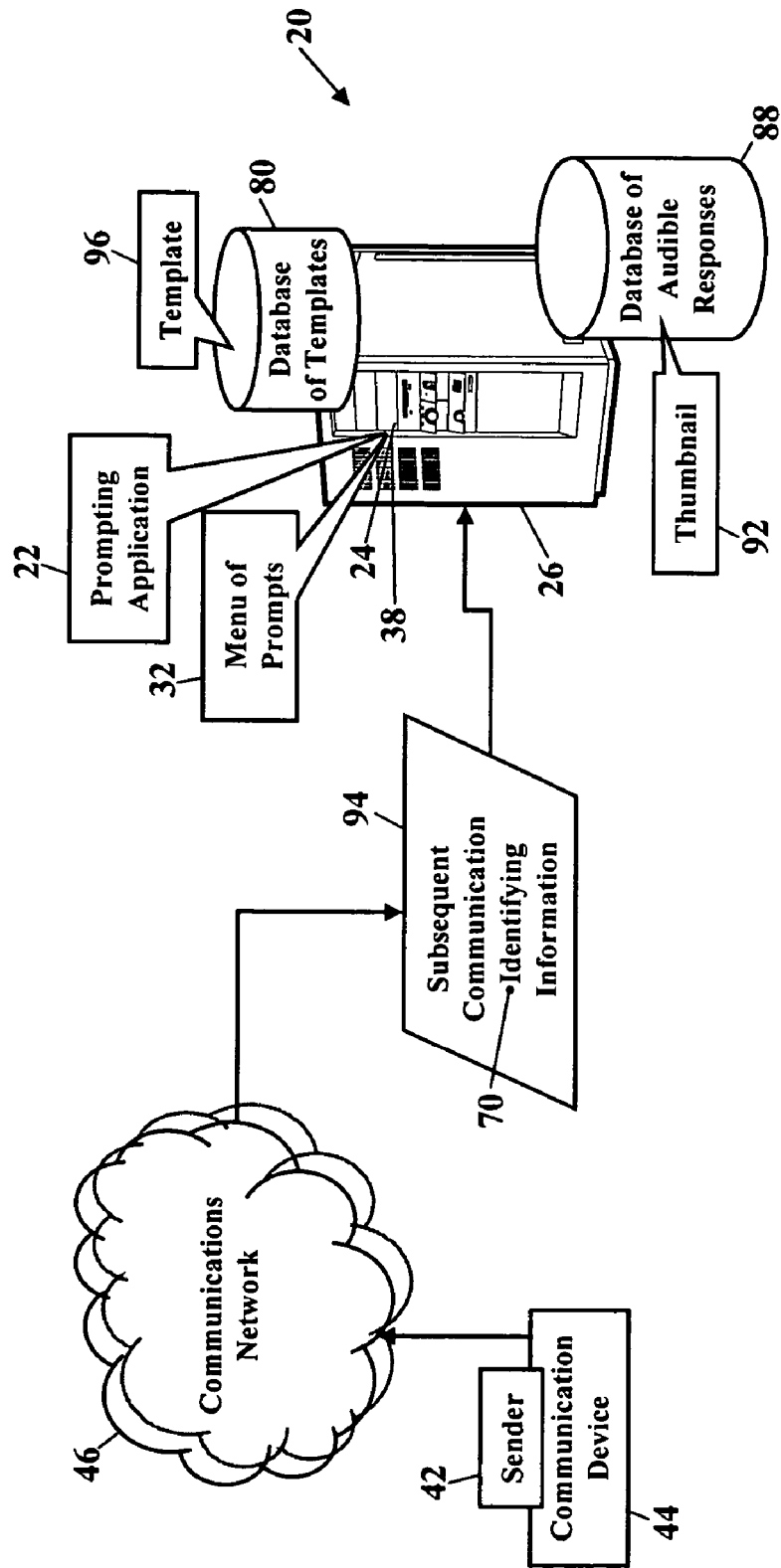

FIGS. 7 and 8 are schematics illustrating the recording of thumbnails, according to yet more exemplary embodiments. Here the prompting application 22 records audible responses to the menu 32 of prompts and then tags those audible responses with location identifiers 34. When a sender interacts with the menu 32 of prompts, the response receiver 30 may record some or all of the responses. During subsequent interactions with the menu 32 of prompts, those recorded responses may then be used to construct personalized prompts. As FIG. 7 illustrates, the response receiver 30 receives the communication 84 from the sender's communications device 44. Here the communication 84 comprises an audible response 86. The prompting application 22 instructs the processor 38 to sample and to store that audible response 86 in a database 88 of audible responses. (If the audible response 86 has analog components, an analog-to-digital converter 90 digitizes the audible response 86.) The prompting application 22 may instruct the processor 38 to sample and record the whole audible response 86. In this embodiment, however, only a short portion of the audible response 86 is sampled and recorded. The processor 38, for example, may sample and record the first few seconds of the sender's audible response 86, thus producing a thumbnail 92. Suppose the menu 32 of prompts presents various prompts for an auto repair facility. When the sender interacts with the menu 32 of prompts, the sender may state "My black Mercedes is having engine trouble." The prompting application 22 instructs the processor 38 to record this response, thus producing the thumbnail 92. The processor 38 then stores the thumbnail 92, and the sender's identifying information 70, in the database 88 of audible responses. As the sender continues to interact with the menu 32 of prompts, the prompting application 22 tags one, some, or all of the sender's responses with the location identifier 34, as above explained.

FIG. 8 illustrates another subsequent communication 94. When the sender later interacts with the menu 32 of prompts, the sender's communications device 44 sends the subsequent communication 94 to the prompting application 22. The subsequent communication 94 communications via the communications network 46 to the prompting system 20. Because the subsequent communication 94 includes the sender's identifying information 70, the prompting application 22 may quickly query the database 88 of audible responses. If the sender's identifying information 70 is found, the database 88 of audible responses returns the thumbnail 92.

The prompting application 20 may then present another personalized greeting. Because the sender's identifying information 70 is found in the database 88 of audible responses, the thumbnail 92 represents a sample recording of the sender's previous interaction with the prompting application 22. The prompting application 22 may then use the thumbnail 92 to present a personalized greeting or personalized prompt. The prompting application 22 accesses the database 80 of templates and retrieves the appropriate template. One such template 96 may be represented by the audible or textual message "[insert sender's identifying information], your last inquiry involved [insert thumbnail], would you like to return to the same destination?"

The prompting application 22 then constructs the personalized prompt. The prompting application 22 collects the sender's identifying information 70 and the thumbnail 92 from the database 88 of audible responses. The prompting application 22 then inserts the information into the template 96. Using the above example, the prompting application 22 produces "Mary, your last inquiry involved 'my black Mercedes is having engine trouble,' would you like to return to the same destination?" If the sender affirmatively responds, the prompting application 22 then queries the database of location identifiers for the destination location identifier associated with the sender's identifying information (as explained and illustrated with reference to FIG. 4). The prompting application 22 collects the previous destination location identifier 34 and immediately presents that same destination prompt to the sender 42 (as the above paragraphs explained). The sender 42 is thus immediately placed into the truncated menu 32 of prompts, thus sparing the sender from again navigating the entire menu 32 of prompts.

The prompting application 22 may process the thumbnail 92. After the processor 38 samples and records the thumbnail 92, that thumbnail 92 may be processed using any technique. The prompting application 22 may invoke any speech-to-text, text-to-speech, or speech/text recognition technique. The thumbnail 92, for example, may be parsed. Using the above example, the prompting application 22 may parse "My black Mercedes is having engine trouble" into "black Mercedes" and "engine trouble." The prompting application 22 thus discards superfluous portions. When the prompting application 22 then constructs the personalized prompt, the parsed thumbnail may be used. The prompting application 22, for example, produces "Mary, your last inquiry involved 'black Mercedes'" or "Mary, your last inquiry involved 'engine trouble.'" The prompting application 22 may then prompt to return to the same destination. Although there are many known techniques for processing responses, the discussion of these techniques is beyond the scope of this disclosure.

Figure 9:
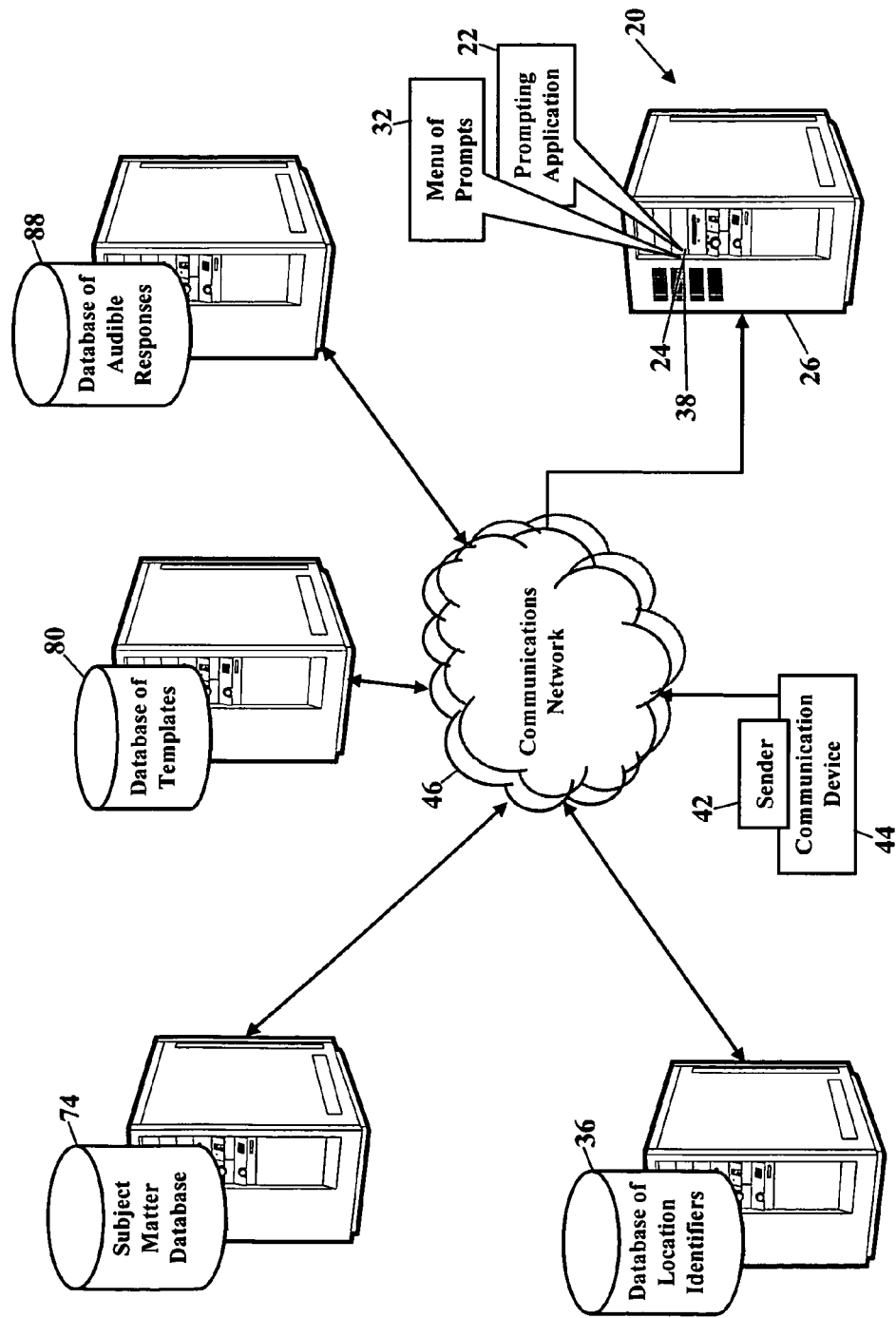
FIG. 9 is a schematic illustrating another network operating environment, according to the exemplary embodiments.

FIG. 9 is a schematic illustrating another network operating environment, according to the exemplary embodiments. Here the prompting application 22 operates within a network environment. That is, the prompting application 22 is remotely located from the database 36 of location identifiers, the subject matter database 74, the database 80 of templates, and/or the database 88 of audible responses. When the prompting application 22 queries either database, queries are sent via the communications network 46. Each database then sends a response via the communications network 46. Networking environments are well known and need not be further discussed. FIG. 9 simply illustrates that exemplary embodiments may operate in any networking environment.

The exemplary embodiments may be applied regardless of networking environment. The communications network 46 may be a cable network operating in the radio-frequency domain and/or the Internet Protocol (IP) domain. The communications network 46 may have POTS components and/or features. The communications network 46, however, may also include a distributed computing network, such as the Internet (sometimes alternatively known as the "World Wide Web"), an intranet, a local-area network (LAN), and/or a wide-area network (WAN). The communications network 46 may include coaxial cables, copper wires, fiber optic lines, and/or hybrid-coaxial lines. The communications network 46 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 10:
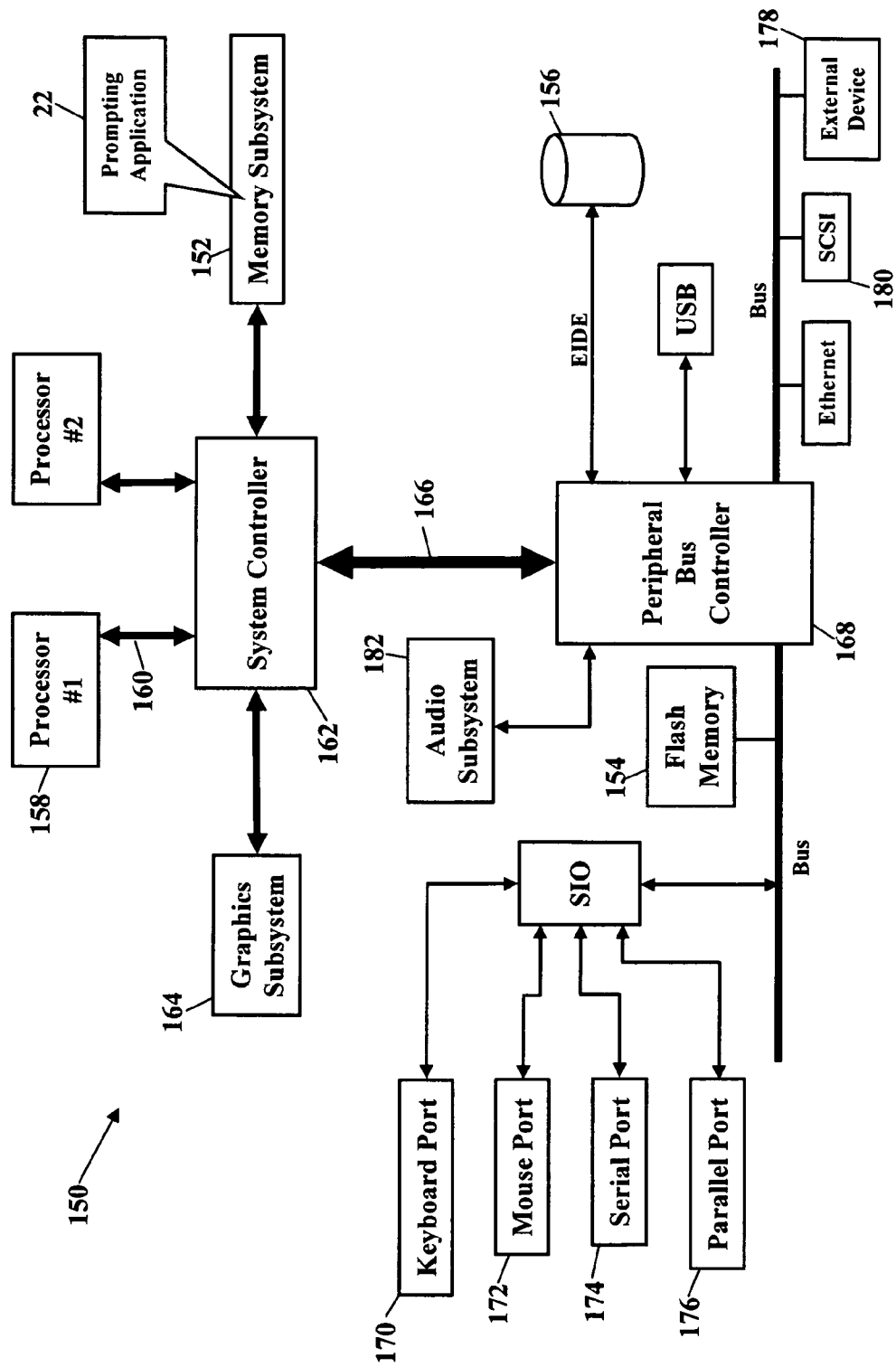
FIG. 10 depicts a possible operating environment for exemplary embodiments.

FIG. 10 depicts a possible operating environment for exemplary embodiments. FIG. 10 is a block diagram showing the prompting application 22 residing in a processor-controlled system 150 (such as the computer 26 shown in FIGS. 1-9). FIG. 10, however, may also represent a block diagram of any computer or communications device in which the prompting application 22 may operate. The prompting application 22 operates within a system memory device. The prompting application 22, for example, is shown residing in a memory subsystem 152. The prompting application 22, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mace is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the computer system 150.

Figure 11:
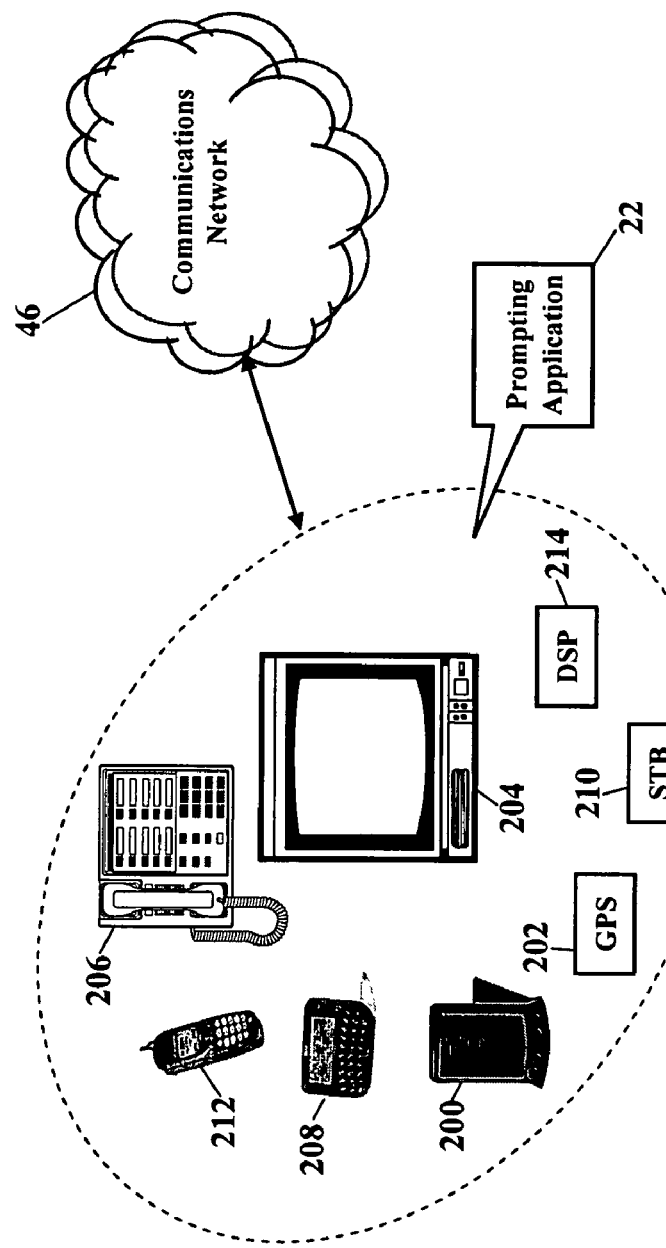

FIG. 11 is a schematic illustrating still more exemplary embodiments. FIG. 11 illustrates that the prompting application 22 may alternatively or additionally operate within various other communications devices. FIG. 11, for example, illustrates that the prompting application 22 may entirely or partially operate within a personal digital assistant (PDA) 200, a Global Positioning System (GPS) device 202, an interactive television 204, an Internet Protocol (IP) phone 206, a pager 208, a set-top-box (STB) 210, a cellular/satellite phone 212, or any computer system and/or communications device utilizing a digital signal processor (DSP) 214. The communications device may also include watches, radios, vehicle electronics, clocks, printers, gateways, and other apparatuses and systems.

Figure 12:
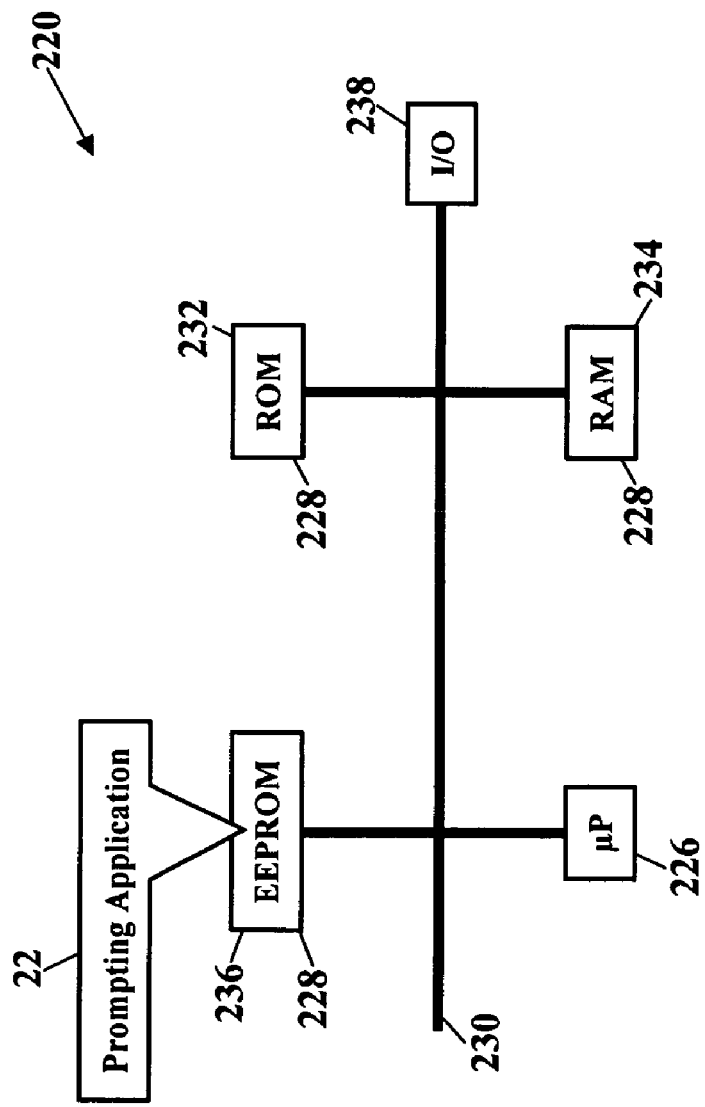

FIGS. 12-14 are schematics further illustrating various other communications devices for processing responses, according to the exemplary embodiments. FIG. 12 is a block diagram of a Subscriber Identity Module 220, while FIGS. 13 and 14 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many communications devices (such as those shown in FIG. 11). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the prompting application 22. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembé, Case, postale 56CH-1211 Geneva 20, Switzerland, Telephone+41 22 749 01 11, Telefax+41 22 733 34 30, www.iso.org).

FIG. 12 is a block diagram of the Subscriber Identity Module 220, whether embodied as the plug 222 of FIG. 13 or as the card 224 of FIG. 14. Here the Subscriber Identity Module 220 comprises a microprocessor 226 (μP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the prompting application 22 in one or more of the memory modules 228. FIG. 12 shows the prompting application 22 residing in the Erasable-Programmable Read Only Memory 236, yet the prompting application 22 could alternatively or additionally reside in the Read Only Memory 232 and/or the Random Access/Flash Memory 234. An Input/Output module 238 handles communication between the Subscriber Identity Module 220 and the communications device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 15:
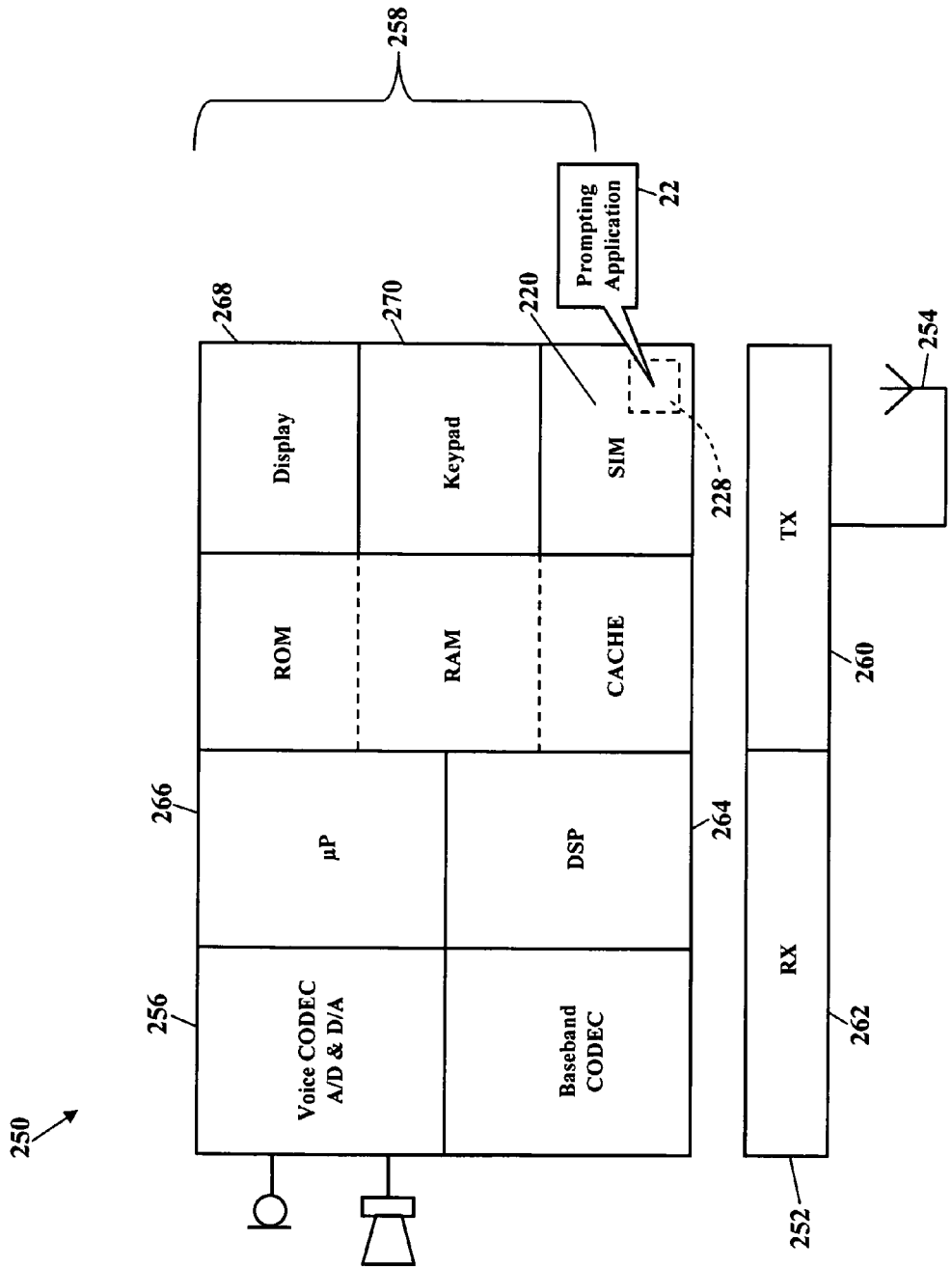

FIG. 15 is a schematic further illustrating various communications devices for processing responses, according to the exemplary embodiments. FIG. 15 is a block diagram of another communications device 250 utilizing any portion of the prompting application 22. In one embodiment, the communications device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 15 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 220. The on-board microprocessor 266 performs GSM protocol functions and control functions for the radio circuitry 260 and 262, for the display device 268, and for the keypad 270. The on-board microprocessor 266 may also interface with the Subscriber Identity Module 220 and with the prompting application 22 residing in the memory module 228 of the Subscriber Identity Module 220. Those of ordinary skill in the art will appreciate that there may be many suitable architectural configurations for the elements of the communications device 250. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The prompting application 22 may be utilized regardless of signaling standard. As those of ordinary skill in the art recognize, FIGS. 12-14 illustrate a Global System for Mobile (GSM) communications device. That is, the communications device utilizes the Global System for Mobile (GSM) communications signaling standard. Those of ordinary skill in the art, however, also recognize the prompting application 22 is equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 16:
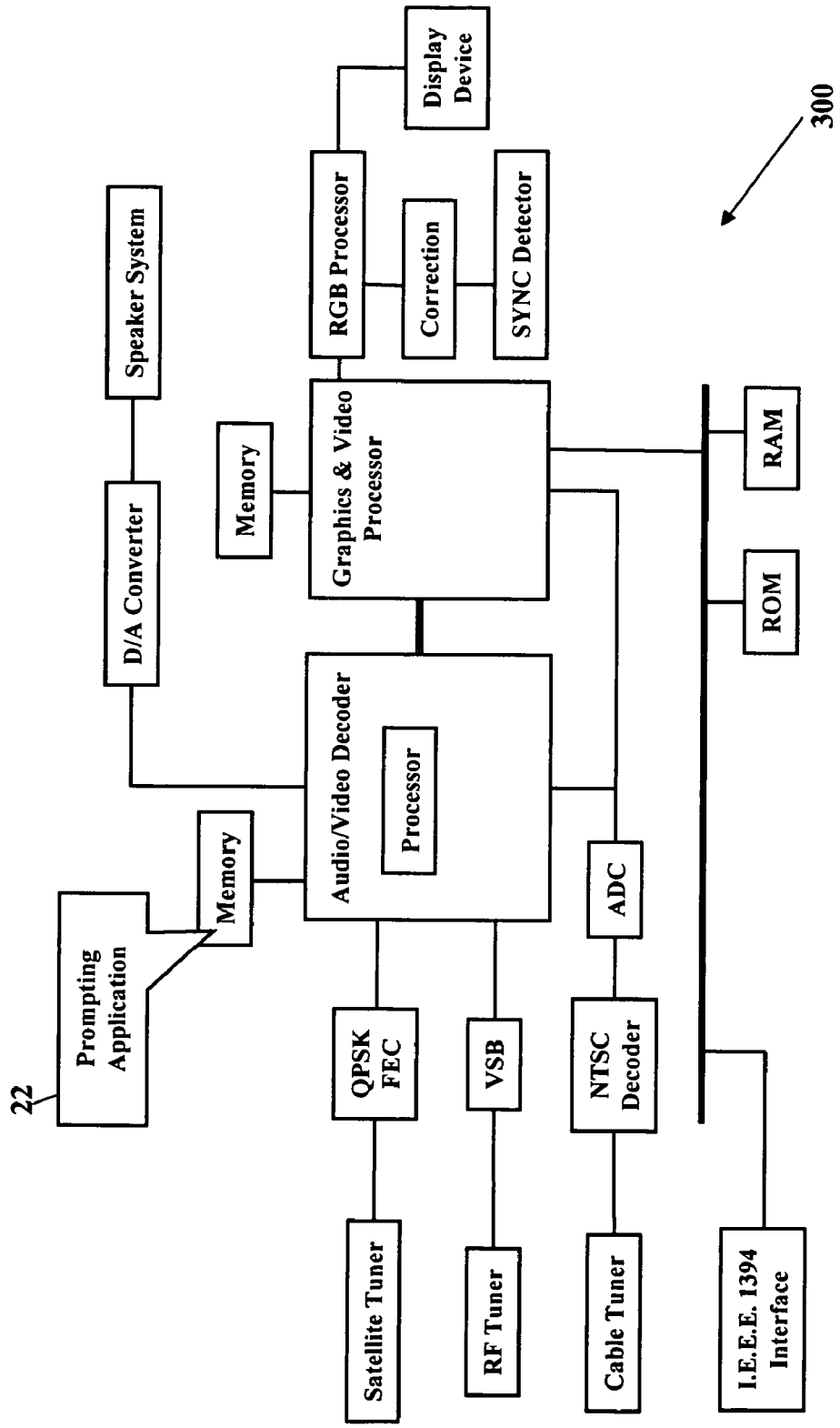

FIG. 16 is a block diagram illustrating another communications device in which the prompting application 22 may operate, according to yet more of the exemplary embodiments. Here the communications device is shown as a digital high definition television (HDTV) system 300. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The prompting application 22 may be stored in any memory location or device in the television 300. FIG. 16, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004), with each incorporated herein by reference.

The prompting application (shown as reference numeral 22 in the FIGS. 1-16) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the prompting application to be easily disseminated. A computer program product comprises the prompting application stored on the computer-readable medium. The prompting application comprises computer-readable instructions/code for processing responses.

The prompting application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
receiving a first communication from a sender;
receiving a destination response to a final prompt in a menu of prompts;
tagging the destination response with a destination location identifier that identifies destination subject matter in the menu of prompts that corresponds to the destination response;
storing the destination location identifier in a database that associates the destination location identifier to an Internet protocol address and to the destination subject matter;
receiving a subsequent communication associated with the Internet protocol address;
querying the database for the Internet protocol address;
retrieving the destination location identifier associated with the Internet protocol address of the first communication from the sender;
querying another database for the destination location identifier, the another database associating location identifiers to another subject matter;
retrieving the another subject matter associated with the destination location identifier;
inserting the another subject matter into a template;
presenting the template during the subsequent communication to return to the destination subject matter of the first communication from the sender; and
navigating to the destination subject matter.

2. The method according to claim 1, further comprising querying to determine whether the sender of the first communication is recognized.

3. The method according to claim 1, further comprising querying for a previous location identifier associated with a previous communication.

4. The method according to claim 1, further comprising prompting the sender of the first communication to return to a subject matter of a previous communication.

5. The method according to claim 1, further comprising retrieving the destination location identifier.

6. The method according to claim 1, further comprising prompting the sender to return to the destination subject matter that corresponds to the destination location identifier.

7. The method according to claim 1, further comprising searching the menu of prompts for a superordinate location identifier.

8. A system, comprising:
a processor executing code stored in memory that causes the processor to:
receive a first communication from a sender;
receive a destination response to a final prompt in a menu of prompts;
tag the destination response with a destination location identifier that identifies destination subject matter in the menu of prompts that corresponds to the destination response;
store the destination location identifier in a database that associates the destination location identifier to an Internet protocol address and to the destination subject matter;
receive a subsequent communication associated with the Internet protocol address;
query the database for the Internet protocol address;
retrieve the destination location identifier associated with the Internet protocol address of the first communication from the sender;
query another database for the destination location identifier, the another database associating location identifiers to another subject matter;
retrieve the another subject matter associated with the destination location identifier;
insert the another subject matter into a template;
present the template during the subsequent communication to return to the destination subject matter of the first communication from the sender; and
navigate to the destination subject matter.

9. The system according to claim 8, wherein the code further causes the processor to query the database to determine whether the sender of the first communication is recognized.

10. The system according to claim 8, wherein the code further causes the processor to query the database for a previous location identifier associated with a previous communication.

11. The system according to claim 8, wherein the code further causes the processor to receive an acceptance to return to the destination subject matter.

12. The system according to claim 8, wherein the code further causes the processor to decline to return to the destination subject matter.

13. The system according to claim 8, wherein the code further causes the processor to query for the template.

14. The system according to claim 8, wherein the code further causes the processor to search the menu of prompts for a superordinate location identifier that bookmarks a node in the menu of prompts that is hierarchically one level above the destination subject matter.

15. A non-transitory computer readable medium storing computer code for performing a method, the method comprising:
receiving a first communication from a sender;
receiving a destination response to a final prompt in a menu of prompts;
tagging the destination response with a destination location identifier that identifies destination subject matter in the menu of prompts that corresponds to the destination response;
storing the destination location identifier in a database that associates the destination location identifier to an Internet protocol address and to the destination subject matter;
receiving a subsequent communication associated with the Internet protocol address;
querying the database for the Internet protocol address;
retrieving the destination location identifier associated with the Internet protocol address of the first communication from the sender;
querying another database for the destination location identifier, the another database associating location identifiers to another subject matter;
retrieving the another subject matter associated with the destination location identifier;
inserting the another subject matter into a template;
presenting the template during the subsequent communication to return to the destination subject matter of the first communication from the sender; and
navigating to the destination subject matter.

16. The computer readable medium according to claim 15, further comprising computer code for querying to determine whether the sender of the first communication is recognized.

17. The computer readable medium according to claim 15, further comprising computer code for querying for a previous location identifier associated with a previous communication.

18. The computer readable medium according to claim 15, further comprising computer code for receiving an acceptance to return to the destination subject matter.

19. The computer readable medium according to claim 15, further comprising computer code for declining to return to the destination subject matter.

20. The computer readable medium according to claim 15, further comprising computer code for querying for the template.

* * * * *